United States Patent [19]

Meier

[11] Patent Number: 6,027,296
[45] Date of Patent: Feb. 22, 2000

[54] FRONT LOADING DATA MEDIA LIBRARY IMPORT/EXPORT MECHANISM

[75] Inventor: James R. Meier, Falcon Heights, Minn.

[73] Assignee: Plasmon IDE, Inc., Eden Prairie, Minn.

[21] Appl. No.: 09/158,360

[22] Filed: Sep. 21, 1998

[51] Int. Cl.[7] .................................................. G11B 15/68
[52] U.S. Cl. ..................... 414/281; 198/468.01; 360/92; 369/36; 369/178
[58] Field of Search ..................... 414/281; 198/468.01; 360/92; 369/36, 178

[56] References Cited

U.S. PATENT DOCUMENTS

| | | |
|---|---|---|
| 4,779,151 | 10/1988 | Lind et al. . |
| 5,010,536 | 4/1991 | Wanger et al. . |
| 5,014,255 | 5/1991 | Wanger et al. . |
| 5,056,073 | 10/1991 | Fitzgerald et al. . |
| 5,062,093 | 10/1991 | Christie et al. . |
| 5,123,000 | 6/1992 | Fitzgerald et al. . |
| 5,255,251 | 10/1993 | Fitzgerald et al. . |
| 5,258,882 | 11/1993 | Apple et al. ............................... 360/92 |
| 5,412,521 | 5/1995 | Dalziel ...................................... 360/92 |
| 5,416,914 | 5/1995 | Korngiebel et al. . |
| 5,454,485 | 10/1995 | Dalziel .................................. 360/92 X |
| 5,498,116 | 3/1996 | Woodruff et al. . |
| 5,502,697 | 3/1996 | Taki ...................................... 360/92 X |
| 5,517,473 | 5/1996 | Permut . |
| 5,537,267 | 7/1996 | Nelson et al. ............................. 360/92 |
| 5,544,146 | 8/1996 | Luffel et al. . |
| 5,596,556 | 1/1997 | Luffel et al. . |
| 5,602,821 | 2/1997 | McPherson et al. . |
| 5,607,275 | 3/1997 | Woodruff et al. . |
| 5,638,349 | 6/1997 | Rugg et al. . |
| 5,640,288 | 6/1997 | Horie . |
| 5,644,559 | 7/1997 | Christie, Jr. et al. . |
| 5,659,440 | 8/1997 | Acosta et al. . |
| 5,662,539 | 9/1997 | Schmidtke et al. . |
| 5,680,375 | 10/1997 | Christie, Jr. et al. . |
| 5,682,096 | 10/1997 | Christie, Jr. et al. . |
| 5,717,665 | 2/1998 | Jones . |
| 5,718,339 | 2/1998 | Woodruff . |
| 5,719,833 | 2/1998 | Jones . |
| 5,726,971 | 3/1998 | Wanger . |
| 5,768,047 | 6/1998 | Ulrich et al. ............................... 360/92 |
| 5,793,563 | 8/1998 | Katsuyama et al. ....................... 360/92 |

*Primary Examiner*—Robert P. Olszewski
*Assistant Examiner*—G. J. O'Connor
*Attorney, Agent, or Firm*—Oppenheimer Wolff & Donnelly LLP; Craig J. Levick; Daniel G. Chapik

[57] ABSTRACT

An integrated data cartridge import/export device controls the operation of both a closure door mechanism and a cartridge media carrier. Each of these two mechanisms are functionally coupled to one another and are driven by a single drive motor, thus simplifying the design and minimizing parts. Further, these two devices interact to insure necessary operational relationships are maintained.

21 Claims, 9 Drawing Sheets

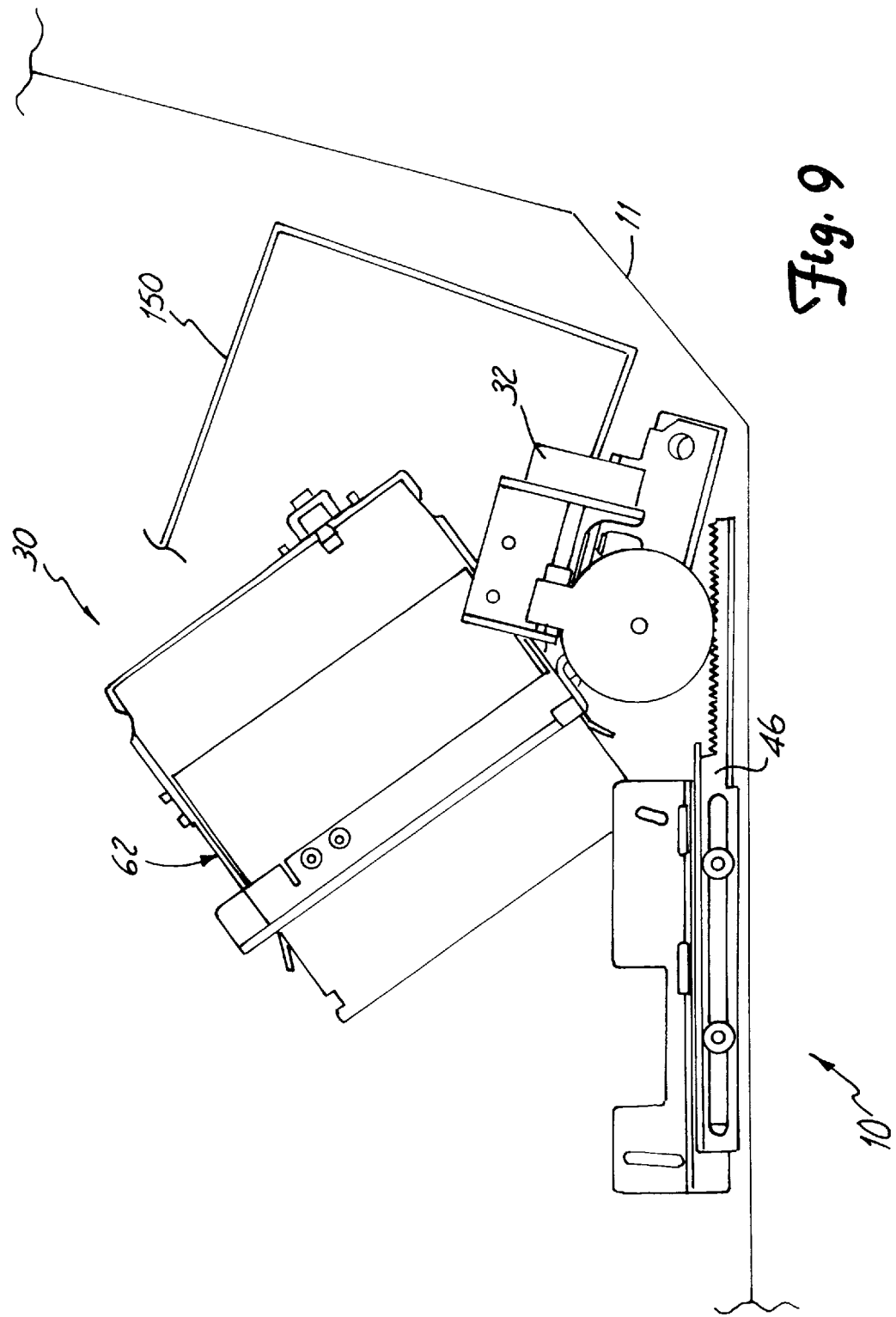

FRONT LOADING DATA MEDIA LIBRARY IMPORT/EXPORT MECHANISM

BACKGROUND OF THE INVENTION

The present invention relates to a mechanism for both inserting data storage medium into a data storage library and removing the same data storage medium. More specifically, the present invention provides a singular unit which allows the insertion or removal of a data storage media through an import/export slot. The data storage medium can then be handled by other mechanisms and integrated into the data storage library.

Data storage needs continue to increase dramatically as computers are becoming more and more powerful. Consequently, high volume storage devices are necessary for many applications. One mechanism for high volume data storage is the well known data storage library in which numerous storage media (e.g. magnetic disks, optical disks, etc.) and numerous read-write devices (i.e. disk drives) are coordinated to manage large amounts of information. More specifically, these data storage libraries typically provide storage slots to house a plurality of data storage media, along with numerous drives capable of reading information from and writing information to these numerous data storage media. Further, the system includes transport mechanisms to selectively transport the data storage media from the storage cells to the drives. These transfer mechanisms are commonly referred to as "pickers", as they pick the appropriate disk or cartridge from storage and place that disk or cartridge in the appropriate drive.

As would be anticipated, complications often arise when trying to populate these data storage libraries. More specifically, in the process of placing the numerous data storage media into the housing there are many considerations or issues to satisfy. First, it is undesirable to allow widespread access to the interior of the data storage library. Typically, the library will include several intricate mechanisms which can be easily disturbed if users are constantly accessing the library's interior.

Widespread access to the interior of the library also potentially creates the potential for damage to the parts contained therein. There is therefore a need to limit the access to the interior of the data storage library so as to avoid potential damage. As is readily apparent, it is undesirable to have foreign objects placed in the data storage library. Also, it is undesirable to allow the user the opportunity to place their fingers within the data storage library. This creates the potential for injury, let alone damage to the device.

Further, the data storage library has the need for cataloging and tracking which particular media has been placed within the system, and where that media is housed. If random access to the interior of the library cabinet is given to the users, the system then has no way to track this information. As it is critical for the data storage library to track all the information and storage media therein, it is beneficial for the library to control how it is being populated.

Another complication in the populating of the data storage media is the physical placement of the import/export opening or slot. There is a necessity to have some type of opening in the housing in order to accommodate the import/export of data storage media The position and placement of this opening is important as it must accommodate user access. Thus the size of the library and the accessibility of certain panels must be considered.

In addition to ease of user access, the import/export opening must be positioned to accommodate the appropriate interaction with the library's media transfer mechanisms. More specifically, it is necessary that, once the data storage media be presented to the data storage library, it be moved to a position so that it could interact with any transport mechanisms to allow transportation and placement of the media. Within library systems, it is necessary for the media to be transported from the receiving location to a storage location and/or to the read-write mechanisms. As it is not practical to have the data cartridge inserted directly into the transport mechanisms, further considerations must be made for this additional transport need. That is, it is necessary for the transport mechanisms to be able to access media placed in the import/export system and transport it to the appropriate location.

In addition to the above mentioned functional and damage considerations, it is not esthetically pleasing to have a permanent opening in the library housing. It is thus highly desirable to have a door or some kind of closure mechanism in front of the opening when a cartridge is not being inserted into the library. This will protect the interior from dust and debris as necessary and will provide the desired appearance.

One prior method of accomplishing import/export needs is through a flip open mechanism in the top of the data storage library. In this capacity, a cartridge holder can simply flip up and allow a cartridge to be inserted within a rotatable lid portion. This is similar to a conventional audiocassette recorder where audiocassettes are placed in the lid portion and the lid is simply closed. By closing the lid, the audiocassette is appropriately positioned for interaction with the recording and playback heads of the audiocassette recorder. In the data storage library application, this same type configuration, when placed on top of the library, can allow easy access by the transport mechanisms to the data cartridge when inserted into the library. This application of the flip lid concept is limited to those situations where the flip open mechanism is placed on the top of the library. However, in situations where the data storage library is relatively tall, it is not practical to place the import/export mechanism on the top of the library cabinet. Also, foreign objects may fall into a top load device. Consequently, this application is not practical for those situations.

Another approach to meeting the import/export needs is through the use of a rotary loading and unloading mechanism located on the side of the library housing. In this application, the loading and unloading mechanism has a number of slots which are adapted to receive cartridges. By rotating this same mechanism 180° about a central axis, these same cartridges are accessible by the transport mechanisms. No closure of the library is provided, however, other than the loading and unloading mechanism. Further, this device is bulky and takes up space within the library housing.

Other systems for the import and export of storage media involve fairly complex transport carriers which receive the cartridges at a first location and then through a series of rotations and translations move the cartridge to a second location wherein the cartridge is accessible by the transport elements. The complex motions of these devices are undesirable as additional parts and mechanisms are necessary. Each of these additional parts and mechanisms are easily capable of failure or may require unnecessary maintenance. Further, these mechanisms do not provide for an integrated closure to the cartridge or its library housing. Often the closure door and the transport mechanism are separate mechanisms and require separate operation. Further, these devices also require separate motors for each operation, thus further complicating the structure.

SUMMARY OF THE INVENTION

The present invention provides a single mechanism which provides for the import and export of data storage cartridges or data storage media. The mechanism allows an import/export slot to be positioned in the front side of the library housing, thus easily accessible to the user. Further, the present invention provides a closure door in front of the import/export slot.

The present invention includes a door mechanism position adjacent to the import/export opening. The door mechanism accommodates a sliding motion of the closure door between an open position and a closed position. This closure door will appropriately open and close the import/export slot to the interior of the library. Further, the present invention includes a media carrier which is adapted to receive the data storage cartridges at the import/export slot when the closure door is open and then to reposition these cartridges at a position which cooperates with additional cartridge movement devices. The media carrier positions itself in these two positions through rotating about an axis of rotation which is positioned adjacent to the import/export slot.

A single drive motor operates to drive both the door mechanism and the media carrier. Through a series of gears, appropriate motions are simultaneously achieved for both the media carrier and the door mechanism. Through the use of a single motor and a cooperating drive mechanism, the system can insure that the door mechanism will be open only when the media carrier is appropriately positioned to receive a data cartridge. Conversely, the door mechanism will be in a closed position when the media carrier is not ready to receive a data cartridge.

It is an object of the present invention to provide a coordinated system which allows the import and export of data cartridges. This import/export function allows the data cartridges to be appropriately manipulated by further devices within the library.

It is a further object of the present invention to accommodate the import and export of data cartridges utilizing a single drive motor to appropriately position cartridges and to provide coordinated control of a door mechanism.

It is another object of the present invention to provide an import/export slot on the front side of the data storage library. This positioning provides easy access for users and accommodates the internal workings of the data storage library. This type of I/E can be placed at any height in the jukebox to make it more accessible.

It is yet another object of the present invention to provide a closure door associated with the import/export slot which restricts access to the interior of the data storage library. This closure door will remain closed at any time when the export/export mechanism is not ready to receive a data cartridge.

BRIEF DESCRIPTION OF THE DRAWINGS

Further objects and advantages of the present invention can be seen by reviewing the following detailed description in conjunction with the drawings in which:

FIG. 9 is a top, partially sectional view of an import/export mechanism, contained within a housing.

DETAILED DESCRIPTION OF THE INVENTION

Figure 1:
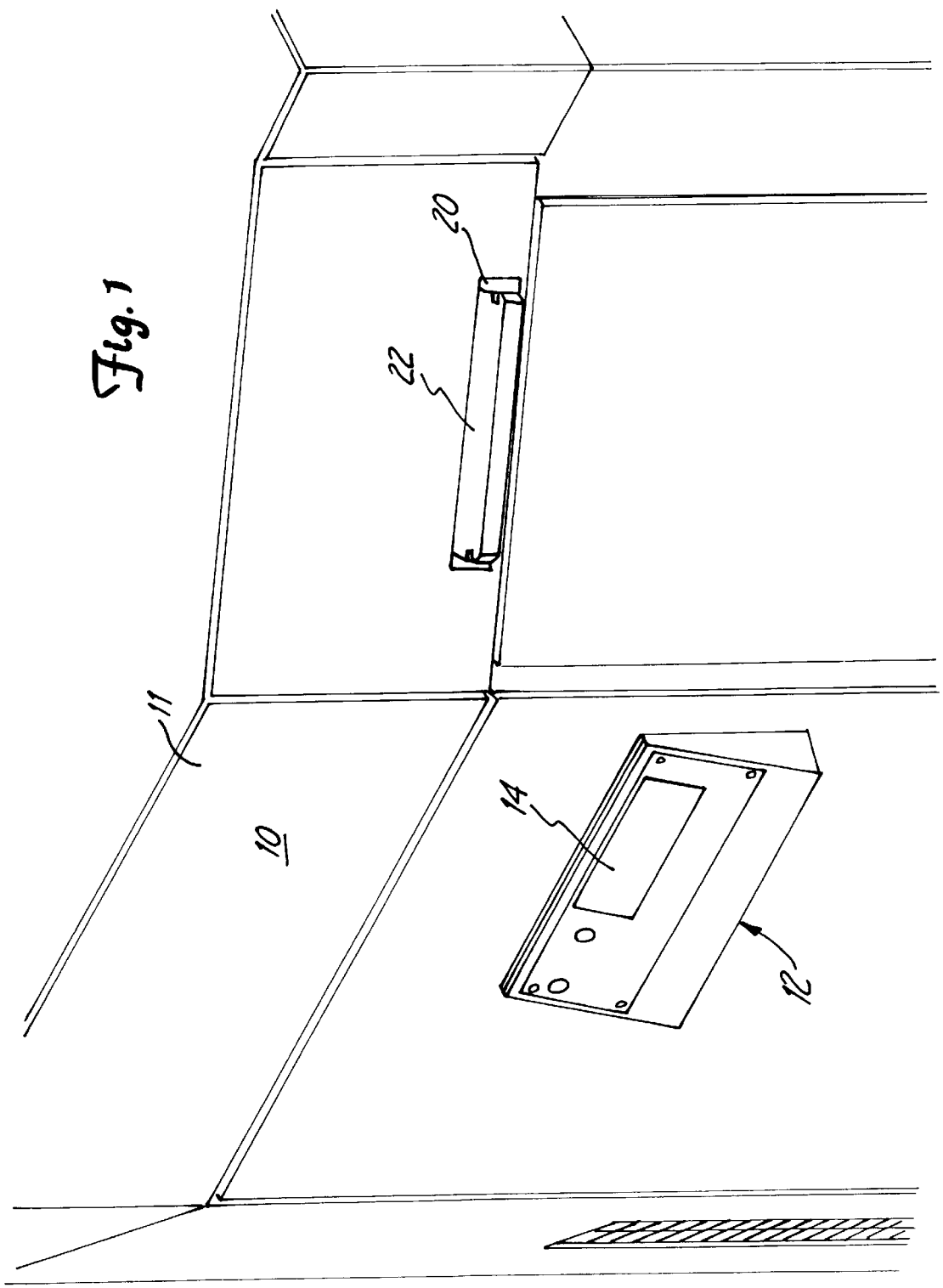
FIG. 1 is a front view of the library housing.

Referring now to FIG. 1, there is shown a front view of a data storage library 10. The data storage library 10 typically includes a housing 11 which encloses all working components that make up the operative data storage library 10. Also shown in FIG. 1 is a control panel 12 attached to a front surface of the data storage library. Control panel 12 includes a display 14 for indicating the current status of several operations within the data storage library.

Also shown on a front side of data storage library 10 is an import/export opening or receiving slot 20. In order to accommodate the import or export of data cartridges, the receiving slot allows access to the interior of the data storage library 10. As shown in FIG. 1, an example data cartridge 22 is shown partially extending through receiving slot 20. In this regard the data cartridge includes all commonly recognized data storage media including magnetic disks, magnetic tape cartridges, optical disks, etc. The mechanisms of the present invention work along with the receiving slot 20 in order to effectively and efficiently accommodate the import and export of data cartridges.

Figure 2:
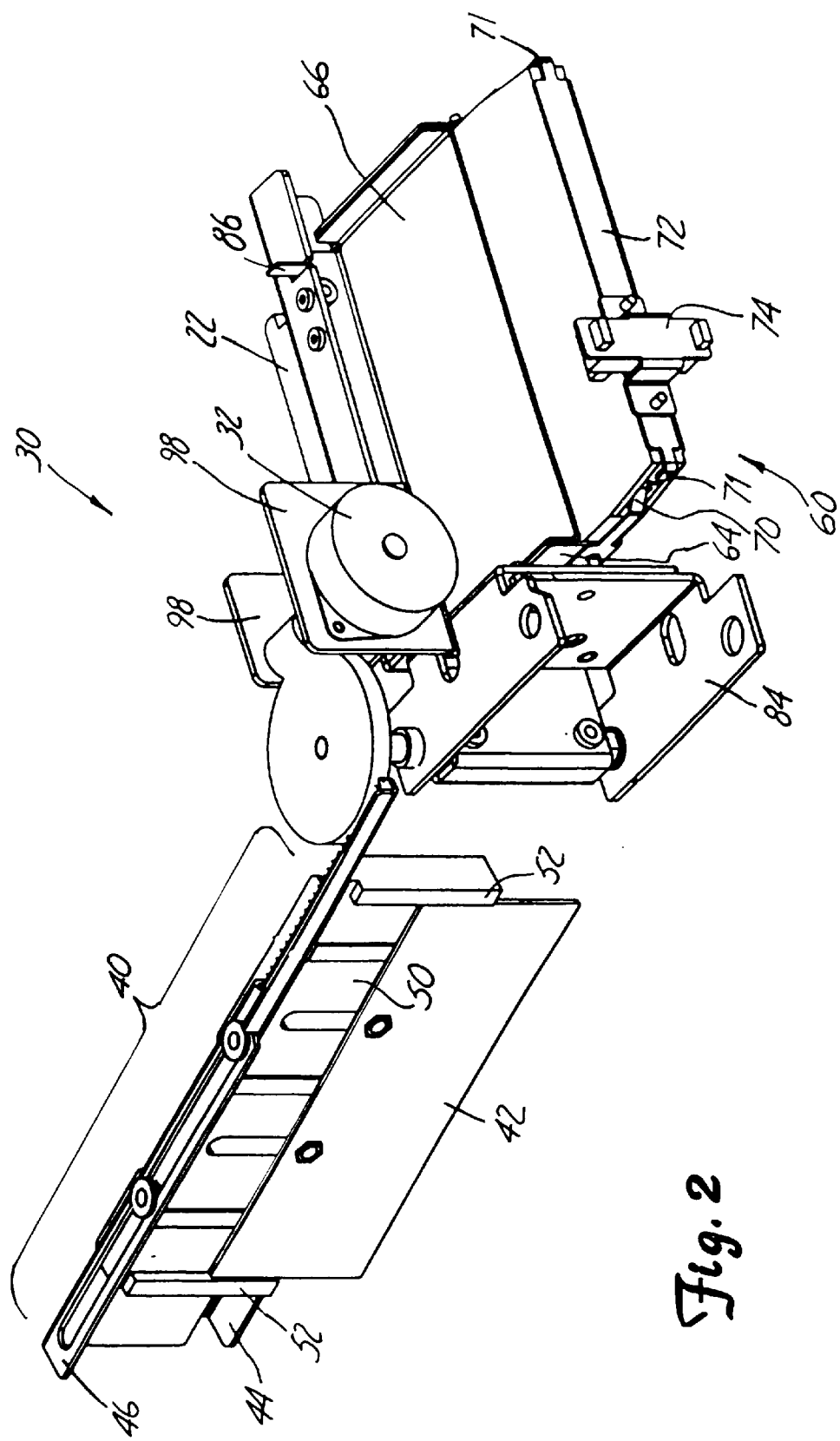
FIG. 2 is a perspective view of the import/export mechanism of the present invention.

Referring now to FIG. 2, there is shown a more detailed view of an import/export handling device 30 of the present invention. As will be more fully described, import/export handling device 30, or I/E handling device 30, performs multiple functions, all coordinated with one another. These functions include the receipt of data cartridges from users at the receiving slot, the manipulation of cartridges, coordination with the data handling mechanisms within the data storage library, and the operation of a protective door which shields the receiving slot when not in use. All of these functions are accomplished using a single drive motor 32 to operate a door mechanism 40 and a media carrier 60.

Figure 3:
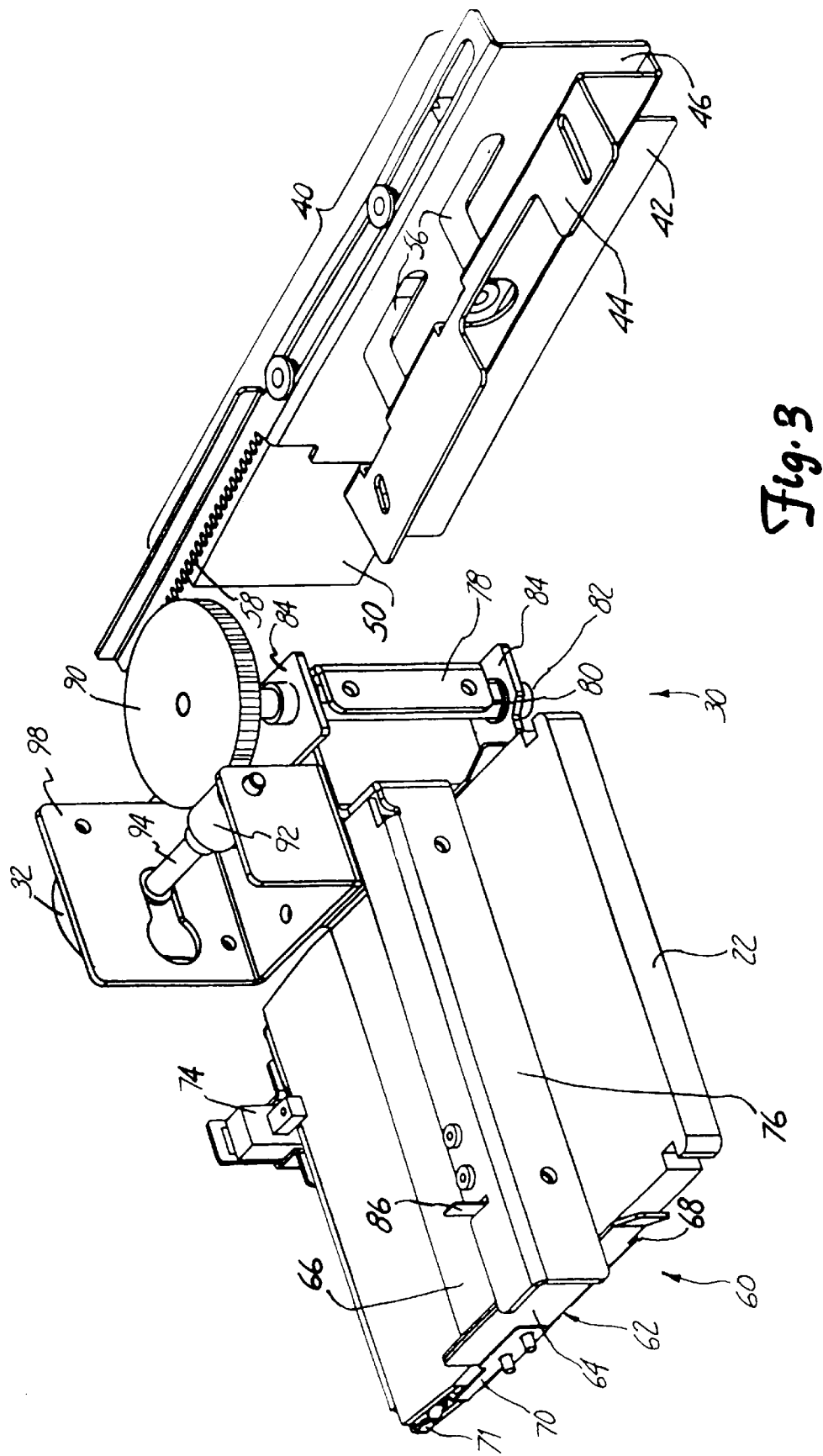
FIG. 3 is a rear perspective view of the import/export mechanism of the present invention.
Figure 4:
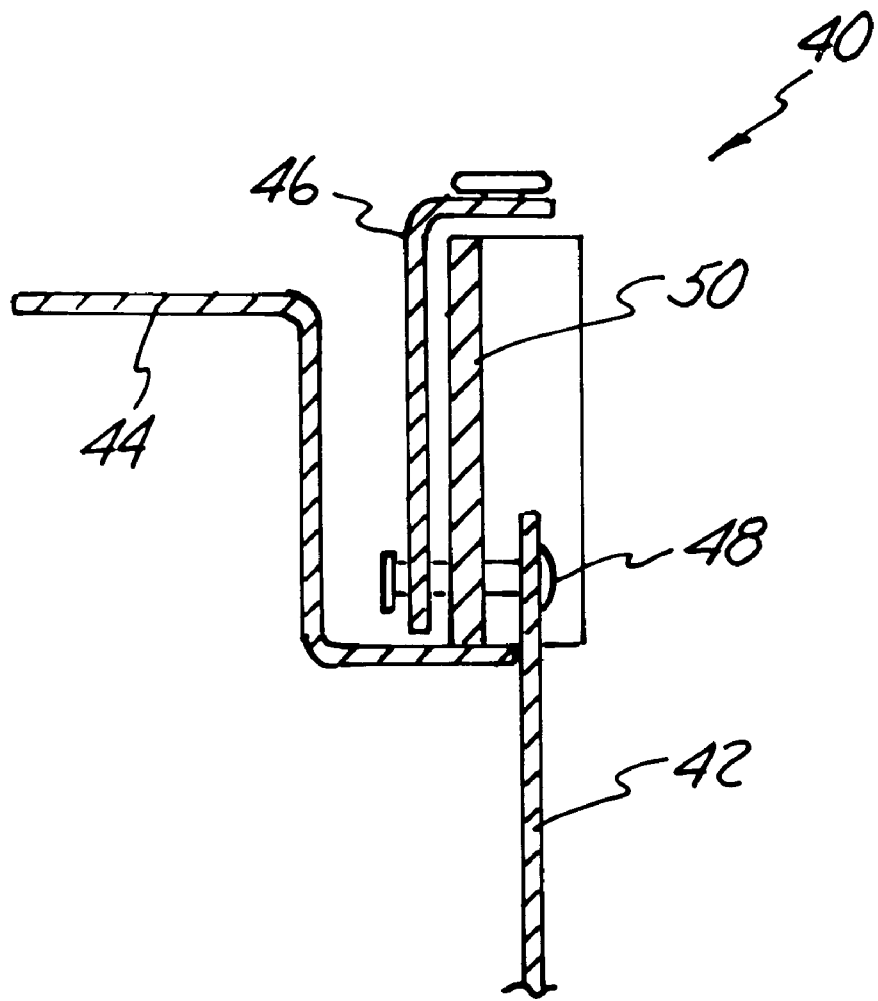
FIG. 4 shows a side cross-section of a door mechanism of the present invention.

Referring now to FIG. 3, a rear view of the I/E handling device 30 is shown. Consistent with the device shown in FIG. 2, I/E handling device 30 includes a door mechanism 40 is shown along with a media carrier 60. Referring now more specifically to FIG. 4, there is shown a side cross-sectional view of door mechanism 40. Door mechanism 40 includes a door shutter or closure plate 42, a holding bracket 44, a guiding plate 50, a translation bracket 46, and an interconnecting pin 48. Interconnecting pin 48 is rigidly attached to door shutter 42 and is also slidably engaged with translation bracket 46 and holding bracket 44. Additionally, door mechanism 40 has guiding plate 50 attached to holding bracket 44.

Operationally, in order to open and close the door shutter 42, translation bracket 46 is moved laterally. Translation bracket 46 has a plurality of slots therein which interact with interconnecting pin 48 to translate this lateral movement into vertical movement of door shutter 42.

Figure 5:
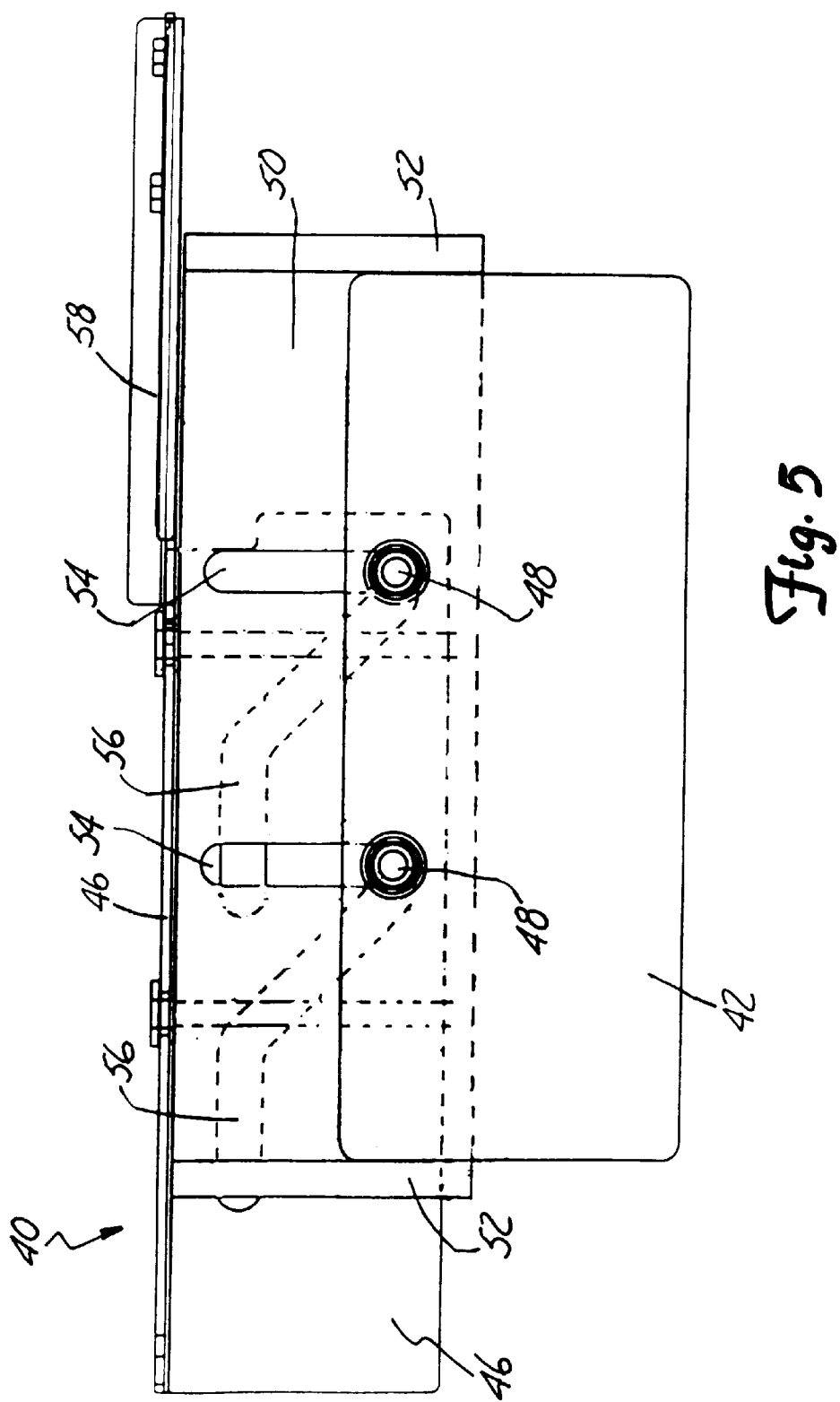
FIG. 5 is a front view of the door closure mechanism of the present invention.

Referring now more specifically to FIG. 5, there is shown a front view of door mechanism 40. As can be seen, guiding plate 50 includes containing ridges 52 on either side thereof and a pair of guiding slots 54 more centrally located. As previously mentioned, interconnect pins 48 are rigidly attached to closure plate 42. Also, these interconnect pins are slidably inserted into guiding slots 54. Thus, guiding slots 54 in conjunction with containing ridges 52 control the vertical movement of door shutter 42. As will be further described, actual energy or movement forces are provided to closure plate 42 through interconnect pins 48.

Positioned immediately behind and over the top of guiding plate 50 is translation bracket 46. As can be seen, translation bracket 46 includes a pair of engaging slots 56, shown in dotted line representation. These engaging slots 56 are also configured to accommodate interconnect pin 48 in a slidable fashion. Through the use of these engaging slots 56, horizontal motion of translation bracket 46 is translated into vertical movement of closure plate 42. As can be seen, horizontal movement of this plate causes the interconnect pins to ride engaging slots 56 and thus raise or lower interconnect pins 48.

Translation bracket 46 also includes a gear tooth surface 58 on one side thereof. Gear tooth surface 58 interacts with a worm gear (not shown) to accommodate this horizontal movement of translation bracket 46. Thus, by having gear tooth surface 58 interact with a worm gear (again not shown in FIG. 5), control and movement of closure plate 52 is accommodated.

Referring back to FIGS. 2 and 3, more detail regarding media carrier 60 can be seen. In summary, media carrier 60 is designed to receive the data cartridge 22 and transport this cartridge to its appropriate locations. Media carrier 60 is designed to accommodate the particular data cartridge utilized. Thus, various configurations are possible. As shown in FIGS. 2 and 3, media carrier 60 includes a cartridge housing 62. Cartridge housing 62 includes a pair of side plates 64, a top plate 66 and a bottom holding plate 68. Further, cartridge housing 62 includes a retaining spring mechanism 70 designed to retain the data cartridge within cartridge housing 62. Additionally, cartridge housing 62 is configured with blocking tabs 71 which prevent backward insertion of cartridge 22 into cartridge housing 62. As is well known, cartridge 22 includes tapered back edges and more "square" front edges. When the cartridge is inserted correctly, the cartridge fits between blocking tabs 71 and can be fully inserted into the cartridge housing 62. Alternatively, if inserted incorrectly, the wider front portion of the cartridge will interfere with these blocking tabs 71 and not allow the cartridge to be fully inserted. Also included is a backstop 72 which defines the rear end of the cartridge housing 62. Attached to backstop 72 is a sensor 74 for detecting the presence of data cartridge 22. Sensor 74 is also utilized to actuate the movement of data cartridge 22. Once inserted, the sensor 74 creates a signal for the control system which causes cartridge housing 62 to be moved within the library 10.

Cartridge housing 62 is attached to a carrying arm 76 which will control and accommodate movement of data cartridge 22. Carrying arm 76 is configured to extend across the data cartridge and at one end of cartridge housing 62. Integral with, and positioned at one end of carrying arm 76, is a connection portion 78 which is designed to be attached to a transfer mechanism 80 which includes a pivoting bolt 82. Through this connection, the rotation of pivoting bolt 82 causes an arch-type motion of cartridge housing 62.

Carrying arm 76 also has attached thereto a sensor flag 86 which is utilized to detect the position of the media carrier 60. A plurality of sensors (not shown) are located in close proximity to media carrier 60 to sense the position thereof. Flag 86 interacts with these sensors to provide appropriate signals therefrom.

Attached to pivoting bolt structure 80 and axially aligned therewith, is a worm gear 90. Worm gear 90 is positioned and designed to interact with gear tooth surface 58 of translation bracket 46. Worm gear 90 is also accommodated to interact with drive gear 92. Drive gear 92 is attached to the drive shaft 94 of drive motor 32. Through this connection arrangement, the operation or powering of drive motor 32 causes rotation of drive shaft 94 and drive gear 92. This also causes rotation of worm gear 90 which in turn causes both movement of translation bracket 46 and rotation of carrying arm 76. (As previously mentioned, any movement of carrying arm 76 also causes movement of cartridge housing 62.)

As can be seen from the configuration of the aforementioned elements, door mechanism 40 and media carrier 60 are both operated by a single drive motor 32. Also, these elements are designed to cooperate with one another and insure that door shutter 42 will be opened when media carrier 60 transports a cartridge toward the receiving slot 20. Further, these two mechanisms (door mechanism 40 and media carrier 60) are configured to insure that closure plate 42 is closed when the data cartridge has been returned back to a mounting position.

The use of transfer mechanism 80 with worm gear 90 and drive gear 92 provides an additional advantage for the I/E device of the present invention. Specifically, when the closure doors open and the cartridge housing is positioned near the receiving slot 20, the media carrier 60 will be held in place. Thus, due to the gear configuration, external forces cannot easily move or reposition the media carrier. This provides an additional security and management feature to insure the cartridge positions are always well known.

As can be seen by referring to FIGS. 2 and 3 once again, pivoting bolt structure 80 is positioned and held in place through the use of a pivot holding bracket 84. Pivot holding bracket 84 is designed to be attached to the frame structure of the data storage library 10.

In a similar fashion, drive motor 32, drive shaft 94 and drive gear 92 are all held in place and correctly positioned through the use of a motor mounting bracket 98. Motor mounting bracket 98 is attached to the frame structure of data storage library 10.

Figure 6:
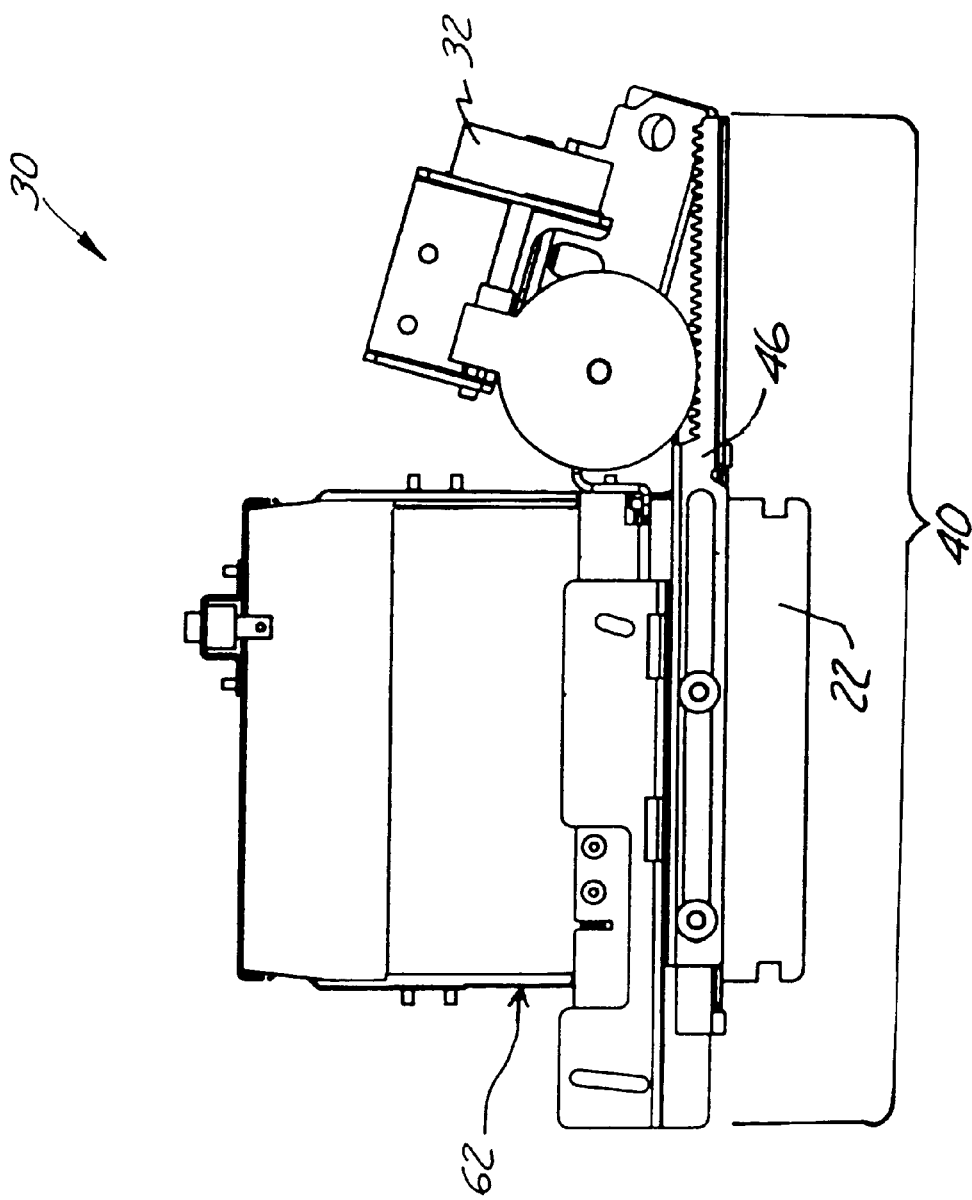
FIG. 6 is a top view of the import/export mechanism showing the cartridge in a mounting position.
Figure 7:
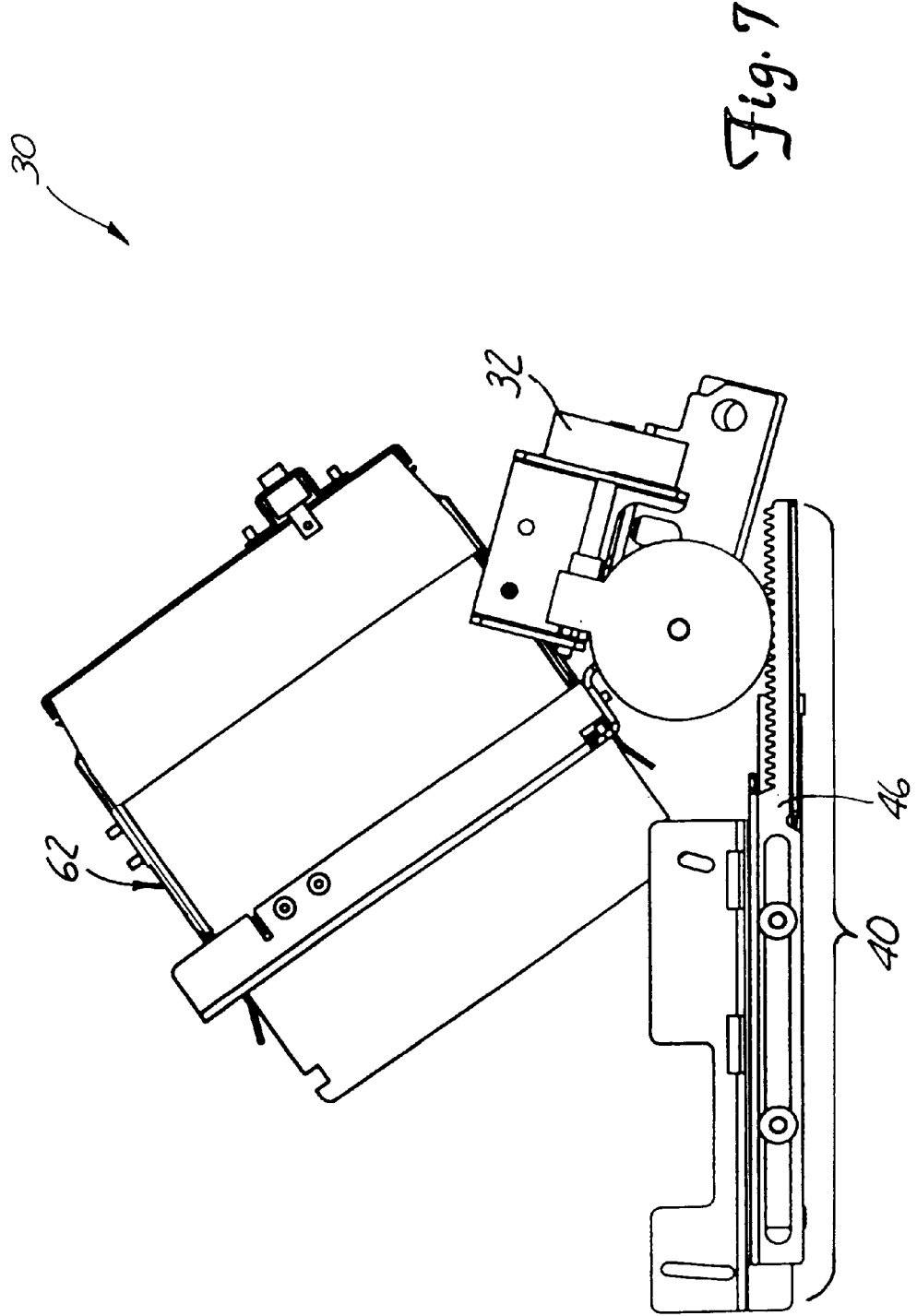
FIG. 7 is a top view of the import/export mechanism showing the cartridge in an intermediate position.
Figure 8:
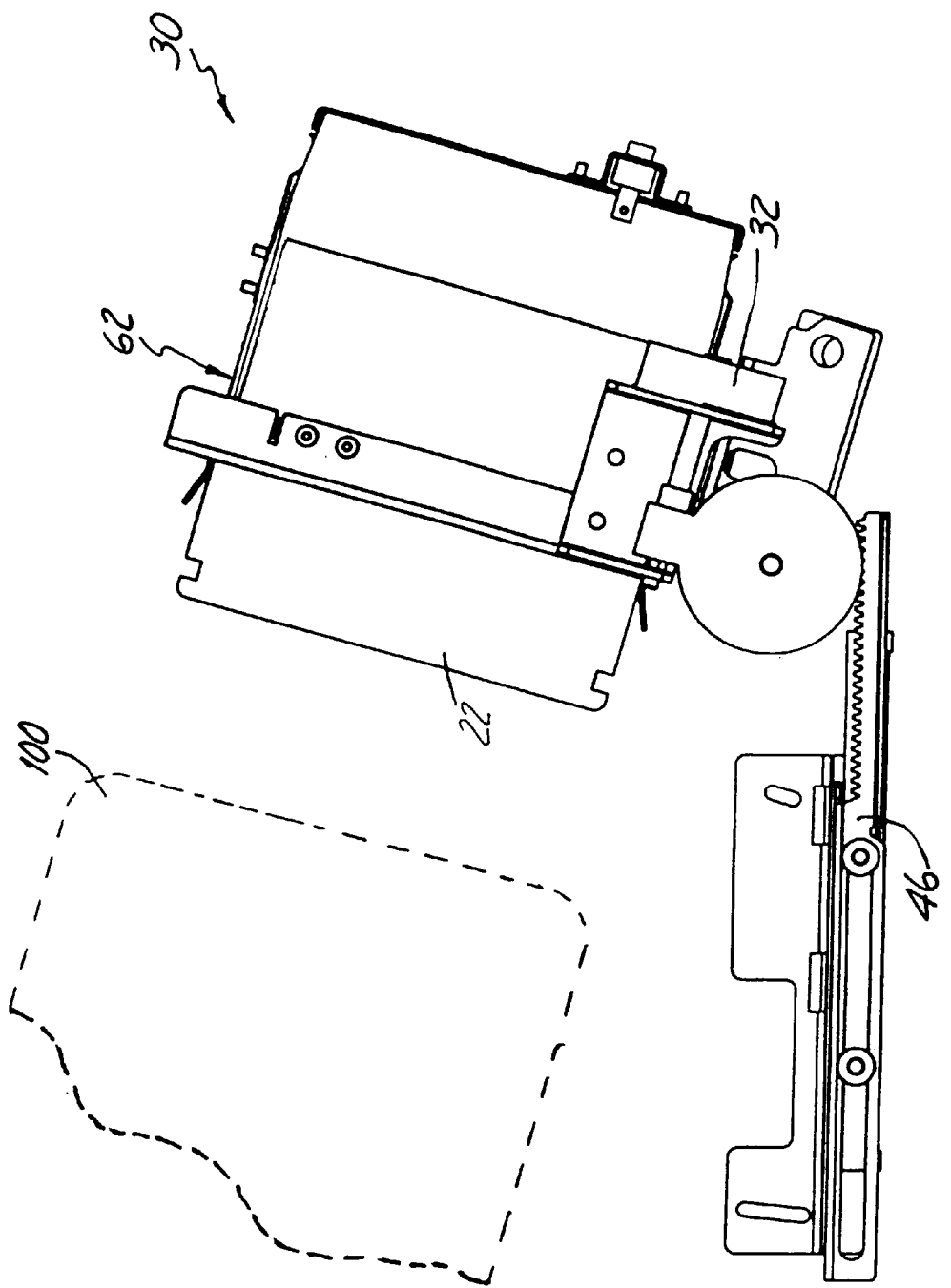
FIG. 8 is a top view of the import/export mechanism showing the cartridge in a loading/unloading position.

Further detail of the operation and positioning of the cartridge 22 can be seen by referring to FIGS. 6–8 which show a top view of I/E handling device 30 in various positions. Referring to FIG. 6, I/E handling device 30 is shown in its access position. In this position, media carrier 60 is swung into a position immediately in front of receiving slot 20 (FIG. 1) and door mechanism 40 is appropriately configured such that closure plate 42 is in its open position. In this condition, data cartridge 22 can be inserted into cartridge housing 62, or, can be removed from cartridge housing 62. This position is used when populating a data storage library or when it is necessary to remove data cartridges.

Referring now to FIG. 7, there is shown a top view of I/E handling device 30 in an intermediate position. As can be seen by comparing FIG. 6 with FIG. 7, cartridge housing 62 has changed its position by rotating approximately 45°. Also, translation bracket 46 has moved laterally. As previously described, this lateral movement of translation bracket 46 causes movement of closure plate 42. In this position, closure plate 42 would be partially closed.

Now referring to FIG. 8, there is shown a further top view of I/E handling device 30 wherein data cartridge 22 is positioned in its mounting position. As previously described, when data cartridge 22 is in its mounting position, further cartridge handling elements of the data storage library can retrieve the data cartridge from cartridge housing 62. In one embodiment of the invention, this mounting position is situated directly in line with a storage column. This storage column is a vertical column of storage bins or storage slots where cartridges are stored prior to their use. Alternatively, the mounting position could be situated within one of these storage columns such that additional storage slots would exist directly above and below the media carrier when it is positioned in its mounting position.

Several well known mechanisms can be used for retrieving the data cartridge from cartridge housing 62. For example, well known pickers replacement devices can be used or designed to retrieve the data cartridge from cartridge housing 62 and transported to a separate location. A sample transport device 100 is shown in dotted line representation on FIG. 8. This transport mechanism 100 can easily be moved to a position immediately in front of cartridge housing 62 and can thus retrieve data cartridge 22. It will be understood that several variations of this transport mechanism are possible.

As can be seen by comparing FIGS. 6 and 8, cartridge housing 62 has now rotated more than 90° to this mounting position. Further, translation bracket 46 has now moved laterally to the end of its travel, thus causing closure door 42 to be fully closed. Again, the motion of both translation bracket 46 and cartridge housing 62 is controlled by the single drive motor 32. Thus, the movement of cartridge housing 62 and translation bracket 46 (as well as the movement of closure plate 42) are all functionally integrated into one operating unit.

Referring to FIG. 9, the import/export device of the present storage library 10 is shown within a portion of housing 11. The cartridge housing 62 is approximately halfway between its mounting position and its access position. As such, a schematic illustration of storage column 150 is revealed.

Having illustrated and described the principles of the invention in the preferred embodiment, it should be apparent to those skilled in the art that the invention can be modified in arrangement and detail without departing from such principles. We claim all modifications coming within the scope and spirit of the following claims.

It is claimed:

1. A media handling unit for transporting a data cartridge from the exterior of a storage library to the interior of the storage library though a receiving slot in the storage library housing, the handling unit comprising:

a door mechanism positioned adjacent the receiving slot including a movable closure plate movable between an open position and a closed position, the closed position being in front of the receiving slot so as to close the receiving slot, and the open position being adjacent to the receiving slot so as to allow the receiving slot to be open and unobstructed;

a media carrier, separate and distinct from the door mechanism, movable between an access position, within the storage library, and adjacent to and aligned with the receiving slot, and a mounting position, within the storage library, and removed from the receiving slot, the media carrier having a receiving slot for receiving the media; and a single drive motor attached to the door mechanism and the media carrier to cause coordinated movement of both the door mechanism and the media carrier so as to receive storage media into the library.

2. The media handling unit of claim 1 wherein the mounting position is within a storage column.

3. The media handling unit of claim 1 further comprising a transfer mechanism attached between the single drive motor and both the door mechanism and the media carrier so as to simultaneously cause the movement of the closure plate and the media carrier such that the movable closure plate is in the open position when the media carrier is in the access position, and the movable closure plate is in the closed position when the media carrier is in the mounting position.

4. The media handling unit of claim 3 wherein the single drive motor includes a drive shaft with a drive gear attached thereto which functionally interacts with the transfer mechanism such that exterior forces will not actuate the door mechanism or the media carrier.

5. The media handling unit of claim 4 wherein the transfer mechanism further comprises a worm gear attached to the transfer mechanism and functionally associated with the drive gear such that rotation of the drive shaft of the single drive motor will cause movement of the transfer mechanism and the door mechanism.

6. The media handling unit of claim 1 wherein the door mechanism further includes a translation bracket attached to the door mechanism such that translational forces applied to the translation bracket will cause translational forces to be applied to the closure door.

7. The media handling unit of claim 6 wherein the translational forces applied to the translation bracket are perpendicular to the translational forces applied to the closure door.

8. The media handling unit of claim 1 wherein the media carrier further includes a cartridge housing for receiving the data cartridge, and a carrying arm, the carrying arm functionally attached to the single drive motor to accommodate rotational motion of the media carrier.

9. The media handling unit of claim 1 wherein the receiving slot is approximately the same height as the closure plate and has a width approximately equal to a width of the data cartridge.

10. An import/export device for accommodating the insertion of a data cartridge into a storage library through a receiving slot in the housing of the storage library, the import/export device comprising:

a single drive motor;

a transfer mechanism coupled to the single drive motor;

a door assembly positioned adjacent the receiving slot having a closure door movable between an open position and a closed position wherein the closure door is substantially in a single plane in both the open position and the closed position, the door assembly further having a door drive mechanism coupled to the transfer mechanism such that operation of the single drive motor will cause movement of the closure door between the open position and the closed position; and a media carrier, separate and distinct from the door assembly, having a cartridge housing for releasably holding the data cartridge, the media carrier coupled to the transfer mechanism and movable between an access position, located entirely within the storage library and adjacent the receiving slot and a mounting position within the library housing and removed from the receiving slot, the movement of the media carrier and the closure door coordinated such that the closure door will be in a closed position when the media carrier is in the mounting position and the closure door will be in an open position when the media carrier is in the access position.

11. The import/export device of claim 10 wherein the mounting position is within a storage column.

12. The import/export device of claim 10 wherein the single drive motor includes a drive shaft with a drive gear attached thereto which functionally interacts with the transfer mechanism such that exterior forces will not actuate the door mechanism or the media carrier.

13. The import/export device of claim 12 wherein the transfer mechanism further comprises a worm gear attached to a pivoting bolt and functionally associated with the drive gear such that rotation of the drive shaft of the single drive motor will cause movement of the transfer mechanism and the door mechanism.

14. The import/export device of claim 13 wherein the media carrier further comprises, a carrying arm, the carrying arm functionally attached to the single drive motor to accommodate rotational motion the media carrier.

15. The import/export device of claim 14 wherein the carrying arm is attached to the pivoting bolt.

16. The import/export device of claim 10 wherein the door drive mechanism further includes a translation bracket attached to the door mechanism such that translational forces applied to the translation bracket will cause translational forces to be applied to the closure door.

17. The import/export device of claim 16 wherein the translational forces applied to the translation bracket are perpendicular to the translational forces applied to the closure door.

18. The import/export device of claim 10 wherein the media carrier further comprises, a carrying arm, the carrying arm functionally attached to the single drive motor to accommodate rotational motion the media carrier.

19. The media handling unit of claim 10 wherein the receiving slot is approximately the same height as the closure door and has a width approximately equal to a width of the data cartridge.

20. A data cartridge handling device for coordinating the importing of data cartridges into a storage library through a receiving slot in the housing of the storage library, the handling device comprising:

a single drive motor having a drive shaft with a drive gear attached to the drive shaft;

a transfer mechanism having a rotational shaft and a worm gear, the worm gear cooperating with drive gear such that rotation of the drive shaft will cause rotation of the rotational shaft;

a door mechanism having a closure door coupled to a translation bracket, the translation bracket interacting with the drive gear such that rotation of the worm gear will cause translational movement of the translation bracket in a first direction, the translational movement of the translation bracket will in turn cause the opening and closing of the closure door in a second direction, perpendicular to the first direction; and a media carrier, separate and distinct from the door mechanism, attached to the transfer mechanism rotational shaft, the media carrier having a cartridge housing for holding the data cartridge when inserted, the media carrier rotatable between an access position adjacent the receiving slot, and within the storage library and a mounting position aligned with a storage column, the media carrier and the door mechanism coordinated such that the closure door will be in a closed position when the media carrier is in the mounting position and the closure door will be in an open position when the media carrier is in the access position.

21. The media handling unit of claim 20 wherein the receiving slot is approximately the same height as the closure door and has a width approximately equal to a width of the data cartridge.

* * * * *